(No Model.)

L. C. JAQUES.
PLOW.

No. 339,658. Patented Apr. 13, 1886.

Witnesses
Susie R. Seiler.
R. W. Bishop.

Inventor
Luther C. Jaques
By his Attorneys
R. S. & A. T. Lacey

UNITED STATES PATENT OFFICE.

LUTHER C. JAQUES, OF STUART, NEBRASKA.

PLOW.

SPECIFICATION forming part of Letters Patent No. 339,658, dated April 13, 1886.

Application filed January 19, 1886. Serial No. 189,074. (No model.)

*To all whom it may concern:*

Be it known that I, LUTHER C. JAQUES, a citizen of the United States, residing at Stuart, in the county of Holt and State of Nebraska, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an attachment for plows by which the width of the furrow may be increased at the pleasure of the driver, and it is also adapted to cut the weeds and loosen the soil next the landside of the plow, as will be hereinafter explained.

It consists in the novel features herein described and claimed, and illustrated in the accompanying drawings, in which—

Figure 1:
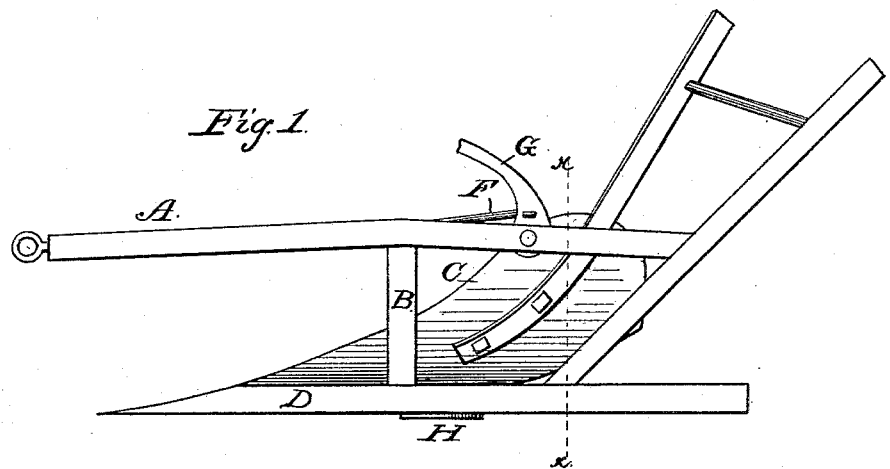
Figure 2:
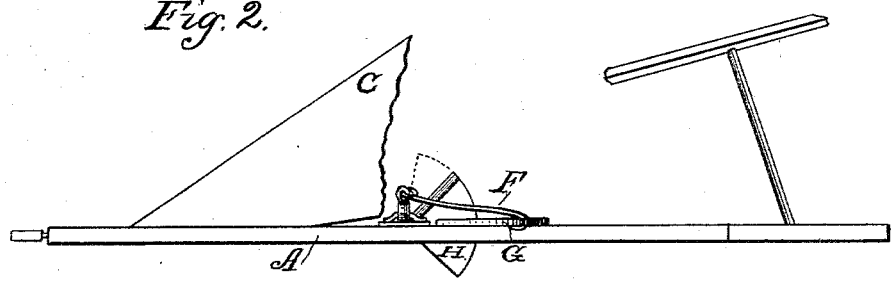
Figure 3:
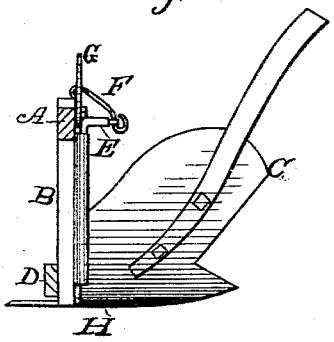

Figure 1 is a side elevation of a plow provided with my attachment. Fig. 2 is a plan view of the same, with a portion of the plowshare broken away. Fig. 3 is a vertical section on the line X X, Fig. 1; and Fig. 4 is a detail perspective view of the attachment.

A represents the beam of the plow, and B the standard. C is the plowshare, and D the landside thereof. Secured to the standard and free to turn in its fastenings is the rod E, the upper end of which is bent at right angles, as shown, and connected by a link, F, to a lever, G, which is pivotally secured to the side of the beam.

Rigidly secured to the lower end of the rod E is a knife, H, which works under the landside, close to the lower edge of the same, as will be understood on reference to Figs. 1 and 3.

Figure 4:
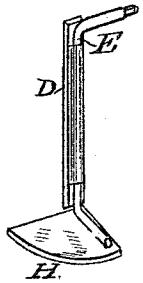

To facilitate the securing of the knife H, I bend the lower end of the rod E at right angles, as shown in Fig. 4, and secure the knife to the bent portion.

The operation of my attachment will be readily understood. When the knife H is in the position shown in full lines, Fig. 2, it will cut into the earth next the landside, thereby loosening the same and cutting all weeds, which would otherwise tend to choke the plow as it is drawn along the next furrow. It will be seen the knife also widens the furrow, and this addition to the furrow may be made more or less by throwing the knife more or less behind the plowshare, as will be understood on reference to Fig. 2. When it is desired to plow without using the knife, it is turned in entirely behind the share, as shown in dotted lines, Fig. 2. This regulating of the knife is accomplished by means of the lever G and link F, attached to the upper end of the rod E, as will be understood. By throwing the lever down the knife is turned in behind the plowshare, and vice versa.

Having thus described my invention, what I claim, and desire to secure by Letters Patent, is—

1. The combination, with the plow, of a shaft vertically journaled relative to the landside thereof, a cutter secured to the lower end of the shaft, and provisions for partially rotating the shaft to project the cutter laterally more or less beyond the plane of the landside, as and for the purposes set forth.

2. The combination, with the plow and standard, of a rod journaled to the standard, a cutter fastened to the lower end of the rod, a lever and pitman connected with the upper end of said rod to partially rotate it to retract the cutter wholly within the track of the plow and project it at an adjusted distance laterally from the landside, as desired, as and for the purposes set forth.

In testimony whereof I affix my signature in presence of two witnesses.

LUTHER C. JAQUES.

Witnesses:
F. F. WEFSO,
JNO. E. SHORT.